United States Patent [19]
Bilich et al.

[11] Patent Number: 5,877,483
[45] Date of Patent: *Mar. 2, 1999

[54] METHOD AND APPARATUS FOR AUTOMATICALLY IMPLEMENTING COMPUTER POWER ON AND LOGON FUNCTIONS USING ENCODED ID CARD

[75] Inventors: James Bilich, Austin; Alan E. Brown, Georgetown, both of Tex.

[73] Assignee: Dell USA, L.P., Round Rock, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 503,779

[22] Filed: Jul. 18, 1995

[51] Int. Cl.$^6$ ............... H04K 1/00; G06K 5/00; G06K 7/01

[52] U.S. Cl. ............ 235/382; 235/380; 235/382.5; 380/23

[58] Field of Search ............... 380/23; 235/380, 235/382, 382.5

[56] References Cited

U.S. PATENT DOCUMENTS

| | | | |
|---|---|---|---|
| 3,596,249 | 7/1971 | Tierney et al. | 235/380 |
| 3,634,657 | 1/1972 | Ballard et al. | 235/449 |
| 3,814,905 | 6/1974 | Lawrence et al. | 235/448 |
| 4,038,522 | 7/1977 | Kleimeyer et al. | 235/437 |
| 4,095,739 | 6/1978 | Fox et al. | 235/302 |
| 4,189,712 | 2/1980 | Lemelson | 235/382 X |
| 4,412,216 | 10/1983 | Mole et al. | 235/382 X |
| 4,519,088 | 5/1985 | Rademacher et al. | 235/382 X |
| 4,689,610 | 8/1987 | Dietrich | 340/51 |
| 4,691,355 | 9/1987 | Wirstrom et al. | 380/123 |
| 4,723,269 | 2/1988 | Summerlin | 379/102 |
| 4,901,068 | 2/1990 | Benton et al. | 235/382 X |
| 4,926,325 | 5/1990 | Benton et al. | 364/408 |
| 4,942,606 | 7/1990 | Kaiser et al. | 380/4 |
| 4,959,860 | 9/1990 | Watters et al. | 380/4 |
| 4,980,836 | 12/1990 | Carter et al. | 364/483 |
| 5,003,578 | 3/1991 | Lin | 379/90 |
| 5,048,085 | 9/1991 | Abraham et al. | 380/23 |
| 5,410,713 | 4/1995 | White et al. | 395/750 |
| 5,588,054 | 12/1996 | Shin et al. | 379/413 |
| 5,668,417 | 9/1997 | Wiscombe et al. | 307/64 |
| 5,671,131 | 9/1997 | Brown | 363/56 |
| 5,715,465 | 2/1998 | Savage et al. | 395/750 |

FOREIGN PATENT DOCUMENTS 19508288  3/1995  Germany .

OTHER PUBLICATIONS

IBM Technical Disclosure Bulletin, vol. 35 No. 6 pp. 173–176, Nov. 1992.

*Primary Examiner*—Anita Pellman Gross
*Assistant Examiner*—Douglas X. Rodriquez
*Attorney, Agent, or Firm*—Haynes and Boone, L.L.P.

[57] ABSTRACT

Method and a system for automatically and securely performing computer power up and logon functions. In one embodiment, the system is implemented in a personal computer ("PC") and comprises a central processing unit ("CPU"), a card reader for reading data encoded on user identification cards "swiped" therethrough, and a power supply capable of constantly providing a low power, or "flea power," signal to various components of the PC, including the CPU and card reader, for enabling a soft power startup of the PC. Responsive to detection of a user identification card being swiped through a slot on the card reader, the card reader reads information for identifying the user, in particular, a user ID and security code, encoded on the card and transmits the read information to the CPU. If the CPU determines that the user identified by the user ID is authorized to access the PC, the PC is powered up and the user is logged onto the PC using the data read from the card. Thereafter, if at any time while the user is logged onto the computer, a determination is made that there has been no I/O activity for a predetermined amount of time, the user is automatically logged off of the PC and the PC is powered down. Similarly, if during operation of the PC, the user ID card is again swiped through the reader, the user will be logged off of the PC and the PC will be powered down.

27 Claims, 2 Drawing Sheets

METHOD AND APPARATUS FOR AUTOMATICALLY IMPLEMENTING COMPUTER POWER ON AND LOGON FUNCTIONS USING ENCODED ID CARD

TECHNICAL FIELD

The invention relates generally to security systems for computers and, more particularly, to a system for implementing computer power up and logon functions using a card reader for reading information encoded on an identification card.

BACKGROUND OF THE INVENTION

The problem of restricting access to and use of a computer to authorized personnel has historically been of great concern. This is especially true in systems in which two or more such computers are interconnected via a server, such that access to and use of software and data stored on the server must also be restricted only to authorized users. Clearly, any acceptable computer security system must strike a balance between the need to fully prevent unauthorized users from access and use with the need to avoid imposing undue burdens on access and use by authorized users.

Perhaps the most common means of implementing a computer security system is to include a password lock function in a keyboard or other input device controller of the computer such that interaction with the computer is inhibited until a valid password has been entered. While this type of system is acceptable for many applications, it suffers certain deficiencies, not the least of which is that users have been known to share their supposedly "secret" passwords with others, thereby potentially breaching the security of the overall system.

Another deficiency inherent in the above-described type of security system is that it typically requires a user wanting to access the computer to perform a number of operations in a certain sequence. For example, when a user first desires to use his or her computer upon arrival at work in the morning, the user must switch on the computer, wait for it to power up and begin booting up, wait for a prompt to be displayed, enter his or her user ID, wait for another prompt, enter his or her password, and then wait for the computer to finish booting up before the user can access the computer. While this entire sequence typically takes only a few minutes, it is apparent that much of the user's time during the execution of the sequence is spent waiting until the computer is ready to accept additional input from the user. As a result, much of the user's time is wasted during this sequence due to the fact that, while the user need not be continually inputting information, he or she is not able to leave the computer to boot up unattended.

Therefore, what is needed is a method and apparatus for automatically implementing computer power up and user logon functions responsive to a single user action.

SUMMARY OF THE INVENTION

The present invention, accordingly, provides a method and a system for automatically and securely performing computer power up and logon functions that overcome or reduce disadvantages and limitations associated with prior methods and systems.

In one embodiment, the system is implemented in a personal computer ("PC") and comprises a power supply, a central processing unit ("CPU") and a card reader for reading data encoded on user identification cards inserted into, or "swiped" through, the reader all interconnected by one or more buses. In accordance with features of the present invention, the power supply is capable of constantly providing a low power, or "flea power," signal to various components of the PC, including the CPU and card reader, for enabling a soft power startup of the PC. In particular, responsive to detection of a user identification card being inserted into, or swiped through, a slot on the card reader, the card reader reads information for identifying the user, in particular, a user ID and security code, encoded on the card and transmits the read information to the CPU.

At that point, a determination is made whether the user identified by the information read from the card is authorized to access the PC. If it is determined that the user is not authorized, the PC remains powered down. In contrast, if it is determined that the user is authorized, the PC is powered up and the user is logged onto the PC using the data read from the card. Thereafter, if at any time while the user is logged onto the PC, a determination is made that there has been no I/O activity for a predetermined amount of time, for example, five minutes, indicating that the user is probably no longer actively using the PC but has forgotten to log off, the user is automatically logged off of the PC and the PC is powered down. Similarly, if during operation of the PC, the card originally swiped through the card reader to power the computer up is again swiped through the reader, the user will be logged off of the PC and the PC will be powered down. In an alternative embodiment, once the card has been read by the card reader, it is inserted into a slot designed to receive the card. Thereafter, the slot is periodically checked to determine whether the card remains inserted therein. Upon removal of the card, the user is logged off of the PC and the PC is powered down. In this manner, the card/card reader combination functions as a type of key lock, such that, when the user removes his or her card from the card reader, a subsequent user is not able to access the PC under the first user's user identification code, thereby providing additional security for the PC and any network to which it may be connected.

In another alternative embodiment, once the PC is powered up, the user is prompted to enter a password associated with his or her user ID, thereby preventing a card lost by an authorized user from being used by an unauthorized user to gain access to the PC under the authorized user's user ID. In yet another alternative embodiment, a level of access may be associated with the user ID of a user, such that different user's may be granted different levels of access based on their user ID.

A technical advantage achieved with the invention is that it enables a user to cause to be performed the typically numerous steps involved in powering up (or down) and logging on (or off) a PC with a single action, that is, a card swipe.

Another technical advantage achieved with the invention is that it can function as a keylock device to provide additional security in preventing a subsequent user from being able to use the PC under the user ID of a previous user who forgot to log out of the PC.

A further technical advantage achieved with the invention is that it can provide various levels of security with respect to use of and access to the PC, as well as a network to which it is connected.

DESCRIPTION OF THE PREFERRED EMBODIMENTS

Figure 1:
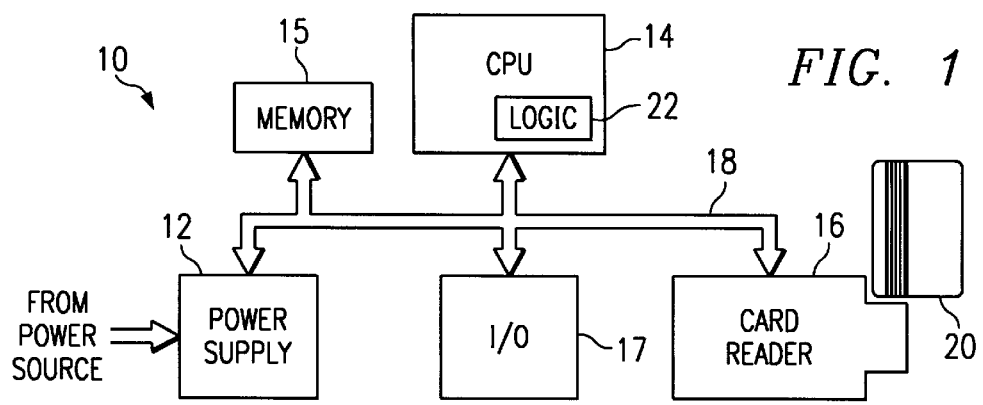
FIG. 1 is a block diagram of computer embodying features of the present invention.

FIG. 1 is a block diagram of a computer, such as a personal computer ("PC") 10, embodying features of the present invention. In the preferred embodiment, the PC 10 comprises a power supply 12 connected to a power source (not shown), which may be, for example, an AC mains (not shown) or one or more batteries, in a conventional manner. The power supply 12 is further connected to a central processing unit ("CPU") 14, memory 15, a card reader 16 and various I/O devices 17 for providing power thereto via one or more buses, represented in FIG. 1 by a bus 18.

In accordance with features of the present invention, the power supply 12 is capable of providing a constant low power (e.g., 50 milliwatts) signal, hereinafter referred to as "flea power," to various components of the PC 10 for enabling a soft power startup of the PC 10, as will be described. In particular, the power supply 12 provides a constant a 5-volt flea power, or "+5 VFP," signal to the CPU 14 and card reader 16 via a +5 VFP line of the bus 18. In operation, when the CPU 14 via logic 22 detects a condition that indicates that the PC 10 is to be powered up, the CPU 14 sinks an active low PSON signal on a PSON line of the bus 18 to ground, causing the power supply 12 to supply full power (e.g., 100 watts) to the PC 10.

In accordance with the features of the present invention, when a user identification card, such as a card 20, is "swiped" through, or inserted into, a slot on the card reader 16, the card reader 16 detects information encoded on the card 20 in the form of a magnetic stripe or bar code, for example, and transmits the read information to the CPU 14. In particular, the information encoded on the card 20 to be read by the card reader 16 comprises a user identification, or "user ID," code, as well as an associated security code, for identifying the user. It is anticipated that, in a manufacturing facility having some type of access control system, wherein employees access to various locations through the facility is restricted based on a level of authorization of the employee, the card 20 will be the employee's ID badge that is used to gain access to restricted areas. For purposes to be hereinafter described, during an initial system setup routine of the PC 10, it is anticipated that a user will be given an opportunity to indicate, by user ID, one or more persons authorized to access the PC 10. The information regarding authorized users is stored in the CPU 14 for purposes that will be described in detail below. As will also be described below, once the user has initialized the PC 10 such that at least one user is authorized to access the PC 10, thereafter, to power up and log onto the PC 10, an authorized user need only swipe his or her encoded ID card through the card reader 16.

Figure 2:
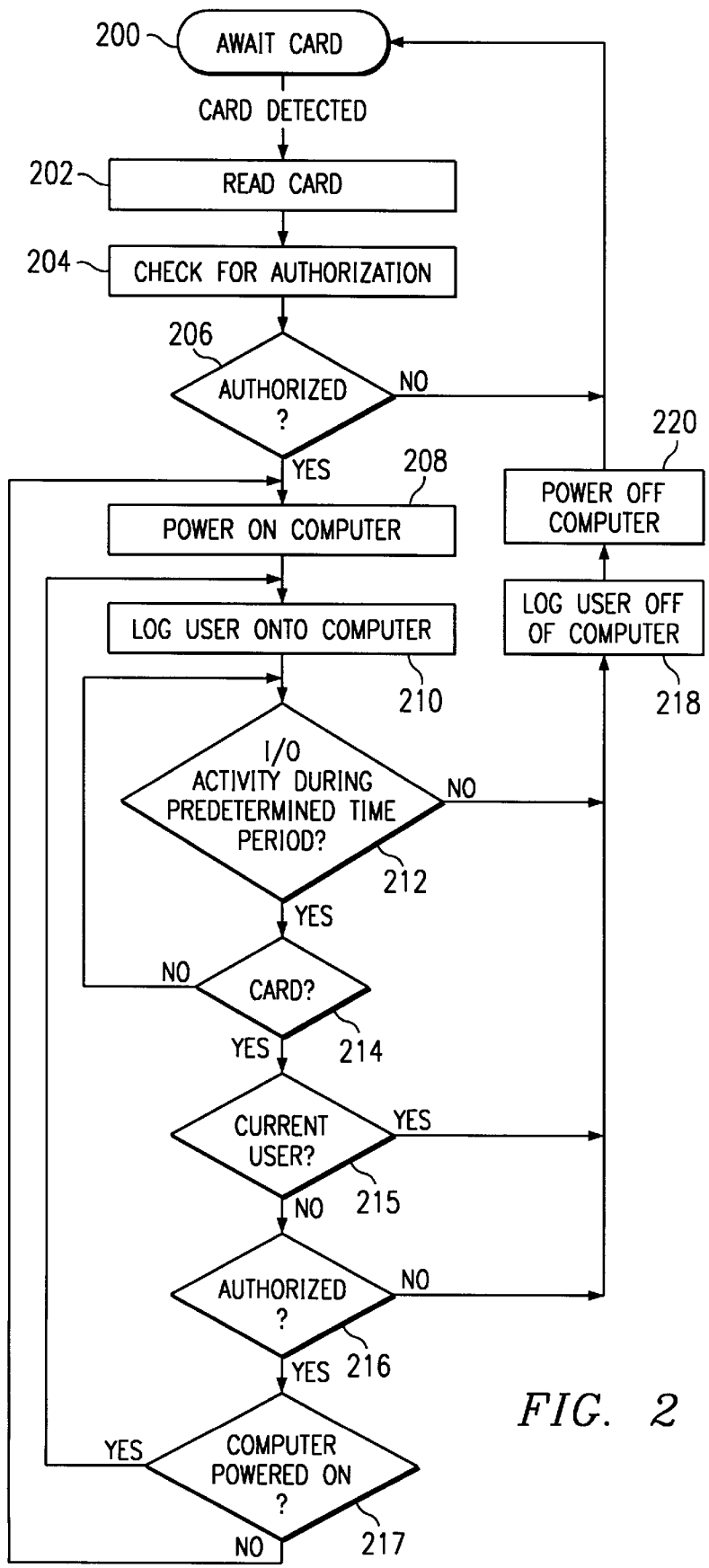
FIG. 2 is a flowchart illustrating a preferred method of implementing the system of the present invention.

FIG. 2 is a flowchart illustrating a preferred method of implementing the system of the present invention, it being understood that logic for implementing the illustrated method may be stored in the memory 15 and/or as part of logic 22. In step 200, the PC 10 awaits detection of a card inserted into the card reader 16. At this point, the PC 10 is in a powered down state, in which minimal power is provided to the CPU 14 and card reader 16 via the +5 VFP signal from the power supply 12, as described above. Upon detection of a card, such as the card 20, being swiped through the card reader, execution proceeds to step 202. In step 202, data encoded on the card, in particular, the user ID and security codes, is read by the card reader 16 and transmitted to the CPU 14 in step 204. In step 206, a determination is made whether the user identified by the data read from the card is authorized. In particular, logic 22 compares the data with the information entered during the system setup identifying authorized users of the PC 10. If in step 206 it is determined that the user is not authorized, execution returns to step 200 and the PC 10 remains powered down.

If in step 206 it is determined that the user is authorized, execution proceeds to step 208, in which the PC 10 is powered up by the CPU's sinking the active low PSON signal, and then to step 210. In step 210, the user is logged onto the PC 10 using the data read from the card in step 202. In step 212, a determination is made whether there has been any I/O activity, for example, keystrokes or mouse movement, within a predetermined period of time. If so, indicating that the user is still actively using the PC 10, execution proceeds to step 214, in which a determination is made whether there has been another card swipe. If in step 214 it is determined that there has not been another card swipe, execution returns to step 212; otherwise, execution proceeds to step 215. In step 215, a determination is made whether the card swiped in step 214 is the same card as that read in step 202. If not, execution proceeds to step 216, in which a determination is made whether the user identified by the card swiped in step 214 is authorized. If so, execution proceeds to step 217, in which a determination is made whether the PC 10 is powered up. If not, execution returns to step 208; otherwise, execution returns to step 210.

If in step 212, it is determined that there has been no I/O activity for the predetermined time period, indicating that the user has most likely finished using the PC 10, execution proceeds to step 218, in which the user is logged off of the PC 10, and then to step 220, in which the PC 10 is powered down. Execution then returns to step 200. Similarly, if in step 215, it is determined that the card swiped is the same card read in step 202, indicating that the user wishes to power down and log off of the PC 10, or if in step 216 a determination is made that the user identified by the card swiped in step 214 is not authorized, execution proceeds to steps 218 and 220 and then returns to step 200. In this manner, an authorized user is able automatically to power up and log onto the PC 10 merely by swiping his or her employee ID card through the card reader 16.

Figure 3:
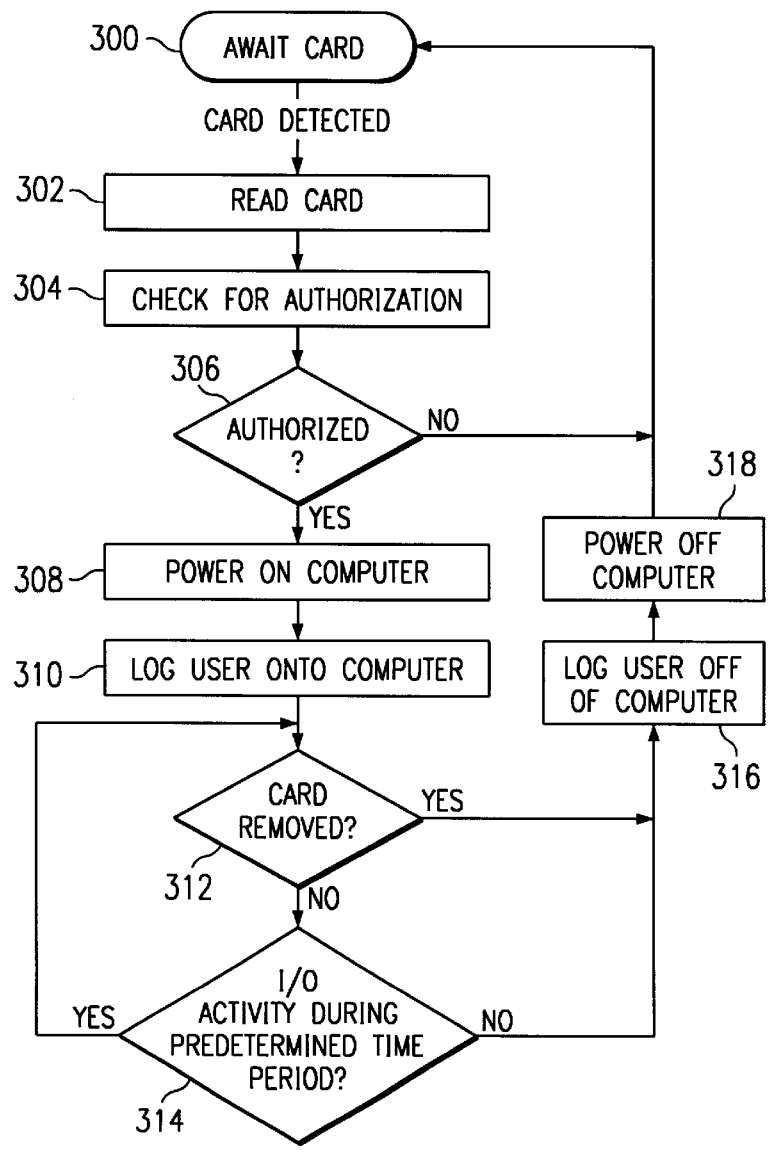
FIG. 3 is a flowchart illustrating an alternative method of implementing the system of the present invention.

In an alternative embodiment, the operation of which is illustrated in FIG. 3, the card reader 16 is of a type in which the card is bodily inserted into a slot in the card reader, rather than being swiped therethrough, to be read; alternatively, the card reader 16 may be a card swipe reader and additional slot may be provided for receiving the card once it has initially been swiped. It should be understood that instructions for implementing the method shown in FIG. 3 may be stored in the memory 15 and/or as part of logic 22. In any event, as illustrated in FIG. 3, in step 300, the PC 10 awaits insertion of a card into a slot of the card reader 16. Upon insertion of a card into the slot, execution proceeds to step 302, in which the data encoded on the card is read by the card reader 16 and then transmitted to the CPU 14 via the bus 18. Steps 304 through 310 are identical to steps 204 through 210 of FIG. 2, as described above.

Once the user has been logged onto the PC 10 in step 310, in step 312 a determination is made whether the card has been removed from the reader 16. If not, execution proceeds to step 314, in which a determination is made whether there has been I/O activity within a predetermined period of time.

If it is determined that there has been I/O activity within the predetermined time period, returns to step 312; otherwise, execution proceeds to step 316. Similarly, if in step 312 it is determined that the card has been removed, execution proceeds directly to step 316. In step 316 the user is logged off of the PC 10. Upon completion of step 316, execution proceeds to step 318, in which the PC 10 is powered down, at which point execution returns to step 300.

Accordingly, in the alternative embodiment described above, the card/card reader combination functions as a type of key lock, such that, when the user removes his or her card from the card reader, a subsequent user is not able to access the PC 10 under the first user's user ID, thereby providing additional security for the PC 10 and any network to which it may be connected.

In another alternative embodiment, once the computer is powered up in step 208 (FIG. 2) or 308 (FIG. 3), the user could be prompted to enter a password associated with his or her user ID, thereby preventing a card lost by an authorized user from being used by an unauthorized user to gain access to the PC 10 under the authorized user's user ID.

In yet another alternative embodiment, a level of access may be associated with the user ID of a user, such that different user's may be granted different levels of access based on their user ID. This may be indicated during the above-described system setup procedure.

It is understood that the present invention can take many forms and embodiments. The embodiments shown herein are intended to illustrate rather than to limit the invention, it being appreciated that variations may be made without departing from the spirit of the scope of the invention. For example, the card reader 16 may be implemented using any known type of card readers, including optical and magnetic, depending on the technology used to encode the cards to be read thereby, or, for example, the poser supply 12 could remain on for some length of time to reduce boot time of the next access request instead of the immediate power down shown in FIGS. 2 and 3. In addition, the PC 10 may be connected to a network (not shown), in which case, in steps 210 (FIG. 2) and 310 (FIG. 3), and steps 218 (FIG. 2) and 316 (FIG. 3), the user will be logged onto and off of the network, respectively, as well as or instead of the PC 10.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of controlling user access to and use of a computer, the method comprising the steps of:

supplying a constant low power signal to a CPU and a card reader;

reading with the card reader user identification data encoded on a card;

detecting via logic in the CPU a signal generated from the card reader that the computer is to be powered up;

determining whether a user identified by said user identification data is an authorized user;

responsive to determination that the identified user is an authorized user, powering up the computer; and providing the user identification data to the computer to log the identified user onto the computer.

2. The method of claim 1 wherein the computer includes a logon procedure that is initiated after the computer has been powered up and wherein the logon procedure successfully completes in response to receipt of the user identification data.

3. The method of claim 1 further comprising:

monitoring I/O activity of said computer; and responsive to passage of a time interval of preselected length during which there is no I/O activity, powering down said computer.

4. The method of claim 3 further comprising, responsive to passage of a time interval of preselected length during which there is no I/O activity and prior to said powering down said computer, logging said user off of said computer.

5. The method of claim 1 wherein said reading is performed responsive to insertion of said card into a card reader electrically connected to said computer, the method further comprising, subsequent to said powering up said computer:

responsive to removal of said card from said card reader, powering down said computer.

6. The method of claim 5 further comprising, subsequent to said powering up said computer, responsive to removal of said card from said card reader, logging said user off of said computer.

7. A method of controlling user access to and use of a computer, the method comprising the steps of:

supplying a constant low power signal to a CPU and a card reader;

reading with the card reader user identification data encoded on a card responsive to a first insertion of said card into the card reader;

detecting via logic in the CPU a signal generated from the card reader that the computer is to be powered up;

determining whether a user identified by said user identification data is an authorized user;

responsive to determination that the identified user is an authorized user, powering up the computer; and providing the user identification data to the computer to log the identified user onto the computer;

subsequent to said powering on said computer, responsive to a second insertion of said card into said card reader, powering down said computer.

8. The method of claim 7 further comprising, responsive to a second insertion of said card into said card reader and prior to said powering down, logging said user off of said computer.

9. A method of controlling user access to and use of a computer, said computer comprising a card reader for reading data encoded on a card inserted into said reader, the method comprising the steps of:

supplying a constant low power signal to a CPU and the card reader;

responsive to insertion of a card into said card reader, reading data encoded on said card;

detecting via logic in the CPU a signal generated from the card reader that the computer is to be powered up;

determining whether said read data identifies an authorized user;

responsive to a determination that said read data identifies an authorized user, powering said computer on; and subsequent to said powering said computer on, logging said identified user on to said computer by using the read data.

10. The method of claim 9 further comprising:

monitoring said computer for I/O activity while said computer is powered on; and responsive to detection of a time interval of preselected length during which there is no I/O activity, logging said identified user off of said computer and powering said computer off.

11. The method of claim 9 further comprising, responsive to removal of said card from said card reader, logging said identified user off of said computer and powering said computer off.

12. The method of claim 9 further comprising, subsequent to said powering said computer on, responsive to said card being inserted into said card reader a second time, logging said identified user off of said computer and powering said computer off.

13. An apparatus for controlling user access to a computer, the computer running a logon procedure in response to being powered up, the apparatus comprising:

a power supply connected to supply a constant low power signal to a CPU and a card reader;

the card reader reading information encoded on a card inserted therein, said information identifying a user;

the CPU being operable to detect a signal generated from the card reader that the computer is to be powered up;

logic for determining whether a user identified by said read information is an authorized user;

logic for generating a power up signal responsive to a determination that said identified user is an authorized user;

the power supply electrically connected to said card reader and said generating logic and responsive to said power up signal for powering up said computer; and logic responsive to the computer being powered up for providing a portion of the read information to the logon procedure for logging the identified user onto the computer.

14. The apparatus of claim 13 further comprising:

logic for detecting removal of said card from said card reader; and logic for generating a power off signal to said power supply responsive to removal of said card from said card reader;

wherein responsive to said power off signal, said power supply powers down said computer.

15. The apparatus of claim 13 further comprising:

logic for detecting removal of said card from said card reader; and logic responsive to removal of said card from said card reader for logging said user off of said computer.

16. The apparatus of claim 13 further comprising:

logic responsive to insertion of said card into said card reader while said computer is powered up for generating a power down signal to said power supply;

wherein responsive to said power off signal, said power supply powers down said computer.

17. The apparatus of claim 13 further comprising:

logic responsive to insertion of said card into said card reader while said computer is powered up for logging said identified user off of said computer.

18. The apparatus of claim 13 wherein said information is encoded on said card as a bar code.

19. The apparatus of claim 13 wherein said information is encoded on said card as a magnetic stripe.

20. An apparatus for controlling user access to and use of a computer, the apparatus comprising:

a power supply connected to supply a constant low power signal to a CPU and a card reader, the card reader being a means for reading user identification data on a card inserted therein;

the CPU being operable to detect a signal generated from the card reader that the computer is to be powered up;

means for determining whether a user identified by said user identification data is an authorized user;

means responsive to a determination that said identified user is an authorized user for powering up said computer; and means for providing the user identification data to the computer to log the identified user on to the computer.

21. The apparatus of claim 20 further comprising means responsive to insertion of said card into said means for reading subsequent to said powering on said computer for logging said user off of said computer and powering down said computer.

22. The apparatus of claim 20 further comprising:

means for monitoring input or output ("I/O") activity of said computer; and means responsive to passage of a time interval of preselected length during which there is no I/O activity for powering down said computer.

23. The apparatus of claim 22 further comprising means responsive to passage of a time interval of preselected length during which there is no I/O activity for logging said user off of said computer prior to said powering down said computer.

24. The apparatus of claim 20 further comprising means responsive to removal of said card from said card reader for powering down said computer.

25. The apparatus of claim 24 further comprising means responsive to removal of said card from said card reader for logging said user off of said computer prior to said powering down said computer.

26. The apparatus of claim 20 wherein said means for reading is an optical card reader.

27. The apparatus of claim 20 wherein said means for reading is a magnetic card reader.

* * * * *